United States Patent [19]

Schamel

[11] 3,934,189

[45] Jan. 20, 1976

[54] POWER SUPPLY REGULATOR HIGH-LINE SHUNT BYPASS

[75] Inventor: Alfred H. Schamel, West Linn, Oreg.

[73] Assignee: Tektronix, Inc., Beaverton, Oreg.

[22] Filed: Feb. 20, 1974

[21] Appl. No.: 444,195

Related U.S. Application Data

[63] Continuation of Ser. No. 333,812, Feb. 20, 1972, abandoned.

[52] U.S. Cl. ...................... 321/11; 307/44; 307/92; 307/146; 323/17

[51] Int. Cl.[2] ........................................ H02M 7/02

[58] Field of Search ............ 307/44, 59, 64, 92, 93, 307/98, 100, 146; 317/20; 321/11, 12; 323/1, 6, 17, 22 T, 25

[56] References Cited

UNITED STATES PATENTS

| | | | |
|---|---|---|---|
| 3,098,192 | 7/1963 | Levy et al. | 323/22 T |
| 3,371,262 | 2/1968 | Bird et al. | 321/11 |
| 3,414,802 | 12/1968 | Harrigan et al. | 307/44 X |
| 3,571,691 | 3/1971 | Iwata et al. | 323/22 T |

OTHER PUBLICATIONS

Pohl, "Zener In Preregulator Limits Series Transistor Dissipation", Electronics, Oct. 27, 1969, Vol. 42 No. 22, Page 98.

*Primary Examiner*—A. D. Pellinen
*Attorney, Agent, or Firm*—George T. Noe

[57] ABSTRACT

A power supply system which reduced total power consumption during high-line operation by providing a portion of the load current normally supplied by the series regulator of a series type regulated power supply from a lower voltage source through a passive device.

10 Claims, 1 Drawing Figure

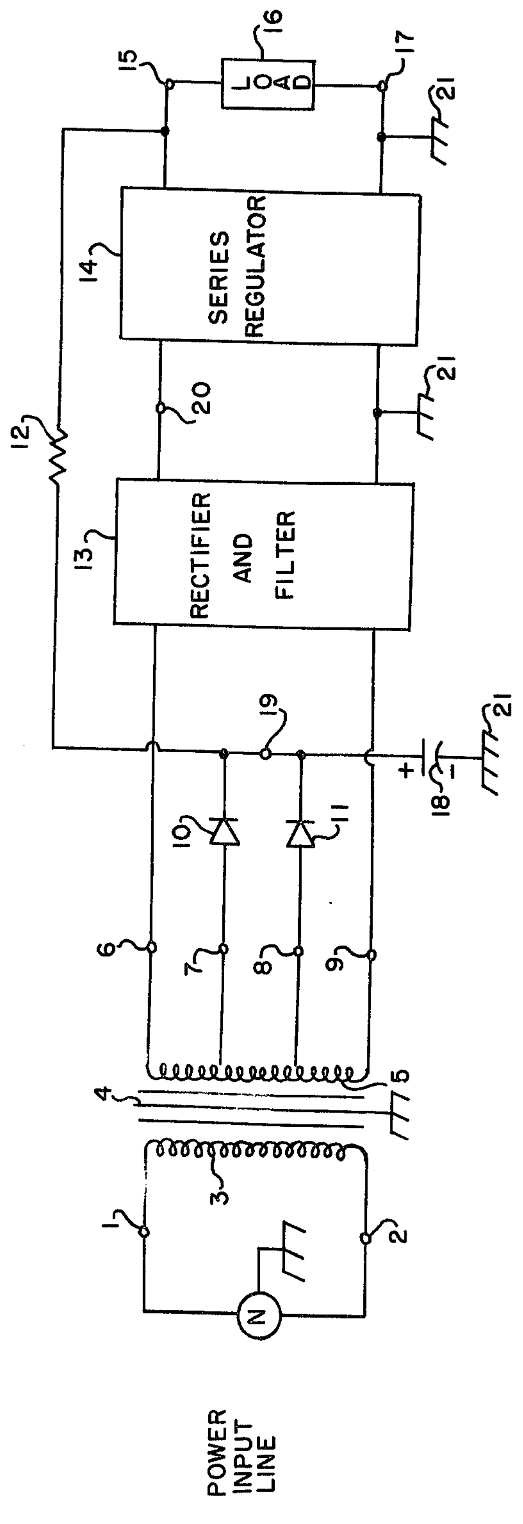
LOAD
SERIES REGULATOR
RECTIFIER AND FILTER
POWER INPUT LINE
N
1
2
3
4
5
6
7
8
9
10
11
12
13
14
15
16
17
18
19
20
21

POWER SUPPLY REGULATOR HIGH-LINE SHUNT BYPASS

This is a continuation of application Ser. No. 333,812 filed Feb. 20, 1973, now abandoned.

BACKGROUND OF THE INVENTION

In many prior art circuits, means and methods have been available to minimize power consumption of series pass devices of series type regulated power supplies. However, such prior art means have not minimized the total power consumption. One example of such means is the bypassing of the series pass device using resistive means during such high line operation. Other examples of series type voltage regulators are found in "Power Supply Circuits", TEKTRONIX, INC., assignee of the present invention.

Means and methods directly related to the present invention (i.e., total power consumption of series type regulated power supplies during high line operation) are shown and described in U.S. Pat. No. 3,060,320, wherein means have been added between the source of primary supply voltage and the series type voltage regulator to reduce voltage variations into the series regulator, hence a reduced consumption of power. Disadvantages of such disclosed prior art are the addition of active components and various reference voltage means required for operation of the active components. Another disadvantage is that all the load current must flow through another active component having current capabilities equivalent to the series pass device capabilities of the series regulated power supply.

BRIEF SUMMARY OF THE INVENTION

The means particularly adapted for minimizing total power consumption of series type regulated power supplies during high line operation of the present invention overcomes the disadvantages of the prior art by using passive devices. The present invention is directed to a resistance connected between a primary supply voltage and the output of the series-type regulated power supply.

In the preferred embodiment, and at high line operation, a voltage lower than the voltage applied to the series pass device is developed across a resistor, which conducts current to a current summing point at the output of the regulated power supply, therefore shunting part of the load current to lower potential. Thus, a reduction of total power consumption is realized.

Accordingly, it is an object of the present invention to minimize total power consumption of regulated power supplies during high line operation.

It is another objective of the present invention to minimize total power consumption of regulated power supplies during high line operation using passive devices.

It is yet another object of this invention to provide a power supply regulator having reduced power dissipation requirements at high line.

It is still another object of the present invention to provide a power supply regulator having less power consumption at high line than at normal line.

It is still yet another object of the present invention to minimize the power dissipation requirements of series pass devices of regulated power supplies during high line operation.

It is a further object of the present invention to provide a power supply regulator having less power consumption at high line whereby high line variations are not disconnected from the series pass device of the power supply regulator.

The subject matter of the present invention is particularly pointed out and distinctly claimed in the following description. The invention, however, both to organization and method of operation together with further advantages and objects thereof may best be understood by reference to the following description taken in connection with the accompanying drawings.

BRIEF DESCRIPTION OF DRAWING

The single FIGURE is a schematic diagram of the preferred embodiment according to the present invention.

DETAILED DESCRIPTION OF PREFERRED EMBODIMENT

The power input line is connected to supply power to a load 16 connected across output terminals 15 and 17. Transformer 4 having primary winding 3 and secondary winding 5 transforms the voltage of the primary supply N to the level required by series regulator 14. The varying output of secondary winding 5 across terminals 6 and 9 is rectified and filtered by rectifier and filter 13 and connected directly to series regulator 14 having load 16 connected across its output terminals 15 and 17. Hence, rectifier and filter 13 and series regulator 14 may be a plurality of such circuits well-known by those skilled in the art such as full-wave or half-wave diode bridge rectifiers and conventional series type regulators respectively.

As can be discerned from the above discussion, series regulator 14 must pass all current supplied to the load 16; hence, any voltage increase in the power input line above the minimum voltage necessary to ensure proper regulation of the load must be absorbed by the series pass device of the series regulator 14 resulting in increased power dissipation in said device. Alternatively, a resistance could be shunted across the series pass device as described in the background of the invention.

The passive circuitry comprising diodes 10 and 11, capacitor 18, and resistor 12 is designed to lower the total amount of power consumed by the regulated power supply under high line conditions to a level which is lower than the power consumed or equal to the power consumed during normal operation; such power savings is obtained by supplying most of the load current through resistor 12 from a voltage source at point 19 which is lower than the voltage source at point 20.

The secondary winding 5 of transformer 4 has selectable taps 7 and 8 connected to the anodes of asymonetrically conducting diodes 10 and 11 respectively. Taps 7 and 8 are selected so that diodes 10 and 11 begin to conduct as the power input line increases above medium line. The cathodes of diodes 10 and 11 are connected together. Disposed between the common connection of the cathodes of diodes 10 and 11 is a resistor 12 and a capacitor 18 connected to output terminal 15 and common connection 21 respectively. As is well-known by those skilled in the art, capacitor 18 may be eliminated if desired. Diodes 10 and 11 in conjunction with capacitor 18 are therefore connected as a full-wave rectifier and filter as is well-known by those skilled in the art.

Circuit operation can best be understood by the following example, which assumes medium line operation as initial condition. Further, assume that with medium line operation, voltage at the point 20 and the output terminal 15 are positive 20 and positive 15 volts respectively when measured with respect to common connection 21. Taps 7 and 8 alternately reach positive 15 volts as the input line alternates. Diodes 10 and 11 are therefore not forward biased and operation of the circuit is well-known by those skilled in the art.

During a period of high line operation, voltage at point 20 increases, but the voltage at output terminal 15 remains at positive 15 volts due to series regulator action; therefore, the voltage at taps 7 and 8 of winding 5 is greater than the voltage at output terminal 15. Diodes 10 and 11 become alternately forward biased, and due to the value of resistor 12 (value of resistor 12 should be chosen so that approximately 90% of the minimum load current will flow through resistor 12), most load current will flow through resistor 12 from point 19, a lower voltage point than point 20 from which current through the pass device must flow. Therefore, total power consumption is reduced for the entire system.

While there has been shown and described the preferred embodiment of the present invention, it will be apparent to those skilled in the art that many changes and modifications may be made without departing therefrom in its broader aspects; therefore, the appended claims are intended to cover all such changes and modifications as fall within the true spirit and scope of this invention.

The invention is claimed in accordance with the following:

1. A power supply regulator high-line shunt bypass circuit comprising:

a first voltage source means;

a second voltage source means of relatively higher magnitude than said first voltage source means, each of said voltage source means adapted for energization by a changing primary voltage;

output terminals;

resistance means having a value of resistance substantially higher than that of conductive wire connected between said first voltage source means and said output terminals for coupling a first voltage from said first voltage source means to said output terminals only when said first voltage source means is energized; and voltage regulating means coupled between said second voltage source means and said output terminals for coupling a second voltage from said second voltage source means to said output terminals when said second voltage source means is energized and for coupling at least a portion of said second voltage to said output terminals when said first voltage source means is energized.

2. A power supply regulator high-line shunt bypass circuit according to claim 1 wherein said first and second voltage source means comprise a transformer having a primary winding and a secondary winding having a plurality of means for providing said secondary voltage source means of relatively higher magnitude than said first voltage source means, said first voltage source means being energized at a high line primary voltage condition.

3. A power supply regulator high-line shunt bypass circuit according to claim 1 wherein said means for providing said first and second voltage source means defines a transformer having selectable connection taps on the secondary winding thereof.

4. A power supply regulator high-line shunt bypass circuit according to claim 1 wherein said first voltage source means defines a full-wave rectifier.

5. A power supply regulator high-line shunt bypass circuit according to claim 1 wherein said first impedance resistance means defines a resistor.

6. A power supply regulator high-line shunt bypass circuit according to claim 1 wherein said voltage regulating means includes an active variable resistance device as a series pass element.

7. A voltage regulator for reducing total power consumption at high line voltage comprising:

first and second alternating sources, the second of which delivers a higher voltage than the first;

a first plurality of asymmetrically-conducting devices connected to said first alternating source for rectifying the output thereof;

a second plurality of asymmetrically-conducting devices connected to said second alternating source for rectifying the output thereof;

output terminals;

a resistive element of predetermined valve, said valve being substantially higher than that of conductive wire, connected between said first plurality of asymmetrically-conducting devices and said output terminals for shunting a percentage of current to said output terminals only during peak excursions of said first alternating source; and means connected between said second plurality of asymmetrically-conducting devices and said output terminals for continuously regulating a voltage at said output terminals to maintain said voltage at a predetermined value at low-line and high-line voltage conditions.

8. A voltage regulator according to claim 7 wherein said means for continuously regulating a voltage at said output terminals includes a series-pass element.

9. A power supply regulator high-line shunt bypass circuit comprising:

a first voltage source means;

a second voltage source means having a higher voltage magnitude than said first voltage source means each of said source means adapted for energization by a changing primary voltage;

output terminals;

a series type regulator means connected between said second voltage source means and said output terminals for providing a continuously regulated voltage to said output terminals for all values of said changing primary voltage; and a resistor directly connected between said first voltage source means and said output terminals for providing a predetermined voltage to said output terminals only during peak excursions of said changing primary voltage.

10. The circuit according to claim 9 wherein said first and second voltage source means comprises a transformer having a primary winding adapted for energization by said changing primary voltage and a secondary winding having selectable connection taps for selecting a plurality of voltage values, and first and second full-wave bridge rectifiers connected to said selectable connection taps.

* * * * *